United States Patent [19]

Eistert et al.

[11] 4,199,924
[45] Apr. 29, 1980

[54] TENSIONING AND SAFETY APPARATUS FOR CONVEYOR CHAIN OF ROW-CROP HARVESTER

[75] Inventors: Theodor Eistert, Neustadt in Sachsen; Christian Noack, Guttau; Bernd Zumpe, Rathmannsdorf; Konrad Bergmann, Langburkersdorf; Gerhard Schmidt, Kirschau; Manfred Teichmann, Bischofswerda; Hans-Peter Spaida, Neustadt in Sachsen; Gerrit Unger, Sebnitz; Arthur Hauschild, Neustadt in Sachsen, all of German Democratic Rep.

[73] Assignee: VEB Kombinat Fortschritt Landmaschinen Neustadt in Sachsen, Neustadt in Sachsen, German Democratic Rep.

[21] Appl. No.: 913,233

[22] Filed: Jun. 6, 1978

[30] Foreign Application Priority Data

Jun. 6, 1977 [DD] German Democratic Rep. ... 199316

[51] Int. Cl.² .................................................. A01D 45/02
[52] U.S. Cl. ....................................... 56/98; 56/10.2; 56/DIG. 15
[58] Field of Search ................. 56/10.2, 10.3, 98, 291, 56/292, DIG. 11, DIG. 15, 10.9; 74/242.1 FP, 242.11; 60/359, 360

[56] References Cited

U.S. PATENT DOCUMENTS

| | | | |
|---|---|---|---|
| 1,607,120 | 11/1926 | Dobler | 60/667 |
| 1,929,852 | 10/1933 | Reid | 74/242.1 FP |
| 3,103,777 | 9/1963 | Harbage | 56/11.6 |
| 3,568,420 | 3/1971 | Hofer et al. | 56/208 |
| 3,599,403 | 8/1971 | Gantz | 56/DIG. 15 |
| 3,647,270 | 3/1972 | Althaus | 74/242.1 FP |
| 3,721,301 | 3/1973 | Weasel, Jr. | 56/DIG. 15 |
| 3,940,913 | 3/1976 | Wallen | 56/98 |
| 4,007,826 | 2/1977 | Brown, Jr. et al. | 74/242.1 FP |

Primary Examiner—Russell R. Kinsey
Assistant Examiner—Paul J. Hirsch
Attorney, Agent, or Firm—Karl F. Ross

[57] ABSTRACT

A row-crop harvester has a frame displaceable along the ground and formed with a plurality of forwardly opening throats at each of which is provided an endless conveyor chain spanned over a drive sprocket and an idler sprocket. A fluid cylinder mounted on the frame is provided for each of the idler sprockets so that when this cylinder is pressurized it can urge the respective idler sprocket away from the respective drive sprocket and tension the respective conveyor chain. A pressure-responsive switch is connected to each of the fluid cylinders and to a magnetic clutch between the drive for the chopper and drive sprockets for the harvester. When the pressure drops suddenly in any of the cylinders, as happens when a chain breaks, his pressure-responsive switch will respond and open the clutch to shut down the harvester.

10 Claims, 4 Drawing Figures

TENSIONING AND SAFETY APPARATUS FOR CONVEYOR CHAIN OF ROW-CROP HARVESTER

FIELD OF THE INVENTION

The present invention relates to a safety and tensioning apparatus for the conveyor chain of a row-crop harvester. More particularly this invention concerns such an apparatus for a stalk-type row-crop harvester of the self-propelled type.

BACKGROUND OF THE INVENTION

A row-crop harvester such as described in German patent publication No. 1,582,211 has a frame displaceable along the ground and forming a plurality of forwardly open throats each adapted to receive a respective row of crop during operation of the harvester. An endless conveyor chain is provided at each of these throats spanned over a drive sprocket and an idler sprocket, with a conveyor stretch of the chain extending along one edge of the respective throat and another return stretch of the chain being provided adjacent this conveyor stretch. The drive for the harvester is coupled to all of the drive sprockets to advance the chains and thereby draw the stalks of row crop backwardly along the throat to the chopper of the harvester.

In the known devices the idler sprocket is urged away from the drive sprocket by means of a spring arrangement to keep the conveyor chain under tension. In case the conveyor chain breaks this tensioning arrangement is set up so as to pinch the broken conveyor chain between the idler sprocket and an abutment to prevent the conveyor chain from entering the chopper of the harvester. This conveyor chain is subject to considerable wear so that its breaking is not a rare occurence. Similarly if the conveyor chain enters the chopper of the harvester considerable damage will be done, so that it is essential to prevent the chain from working free in the event of breakage.

The known systems have several disadvantages. First of all the biasing arrangement typically becomes less effective as the chain stretches with age. This is due to the fact that normal springs are less stiff as they decompress. Furthermore if the chain breaks at or very close to the idler sprocket it is possible for it to work free and enter the chopper of the machine. Another disadvantage is that it is impossible for the operator of the machine to ascertain when a chain is near the breaking point or has so badly stretched as to be likely to break.

OBJECTS OF THE INVENTION

It is therefore an object of the present invention to provide an improved row-crop harvester.

Another object is to provide an improved safety shut-off mechanism for such a row-crop harvester.

Yet another object of the instant invention is to provide a mechanism in a row-crop harvester which will increase the service life of the conveyor chains thereof while at the same time insuring that should a chain break it will not enter the chopper of the harvester.

SUMMARY OF THE INVENTION

The row-crop harvester according to this invention has a plurality of fluid cylinders mounted on the harvester frame and each braced against the idler sprocket of a respective conveyor chain. The cylinder is pressurized so as to urge the idler sprocket away from the drive sprocket and thereby tension the chain between the sprockets. Safety-cutoff means is provided which is connected between the cylinder and the drive means which serves both to rotate the drive sprocket so as to advance the chain and to drive the crop chopper at the output end of the conveyors. This safety-cutoff means includes a pressure-responsive switch which disconnects the drive means from the crop chopper and from the drive sprocket when pressure inside the cylinder drops suddenly or exceeds a predetermined limit.

Thus in accordance with the instant invention if the chain breaks the drive will automatically be disconnected both from the chopper and from the drive sprocket for the chain. This is possible because breakage of the chain will allow the idler sprocket to move suddenly forwardly, thereby depressurizing the cylinder biassing it and causing fluid pressure therein to drop. Similarly if the chain becomes jammed the force effective on the idler sprocket will constantly increase as the drive sprocket rotates to pull in the return stretch of the chain, so that the pressure inside the cylinder will increase considerably. Once this increase exceeds a predetermined limit the drive is, once again, shut down.

In accordance with yet another feature of this invention an end or limit switch is provided which similarly shuts down the drive whenever the idler sprocket moves beyond a predetermined distance away from the drive sprocket. Thus if the chain starts to fail or simply stretches excessively with time this limit switch will be actuated to shut down the drive.

In accordance with this invention the fluid cylinders of the several conveyor chains are all connected through respective check valves to a pulsing source of pressurized fluid. The respective pressure-responsive valves are connected between each cylinder and the respective check valve, and the circuit to the other side of all of the check valves does not exceed a predetermined maximum value so that all of the idler sprockets will be biased with the same force.

Another considerable advantage of the instant invention is that the biasing of the idler sprockets is extremely uniform, both from one conveyor chain to the next, and within the full adjustment range within each conveyor chain. Thus the service life of the conveyor chains is increased considerably since they do not loosen up as they stretch with age as in the prior-art spring-loaded systems.

According to further features of this invention the two stretches of the chains are relatively snugly received in respective passages formed in the frame of the harvester. Thus in the event of breakage these sections or stretches will not be able to swing freely about, but will be relatively snugly contained and kept out of harm's way. Furthermore servicing according to this invention is relatively easy when each check valve is shunted by an openable blocking valve. Thus if a chain breaks the operator need merely shut down the system so as to depressurize the hydraulic circuit upstream of all of the check valves. The pressure will, of course, be maintained within the cylinders of intact chains. The cylinder for the broken chain, however, can be depressurized simply by opening the blocking valve shunting its check valve so that the operator can then push the idler sprocket back toward the drive sprocket and then slip over a fully assembled one-piece conveyor chain. There is no need to painstakingly put together a link of the chain on the site, since the new chain can be placed on the system intact and the old chain can be taken back to the shop for rebuilding. Once the chain has been replaced the blocking valve is closed and the system will automatically repressurize itself and allow the chopper drive and chain drive to start. It is also, of course, possible to provide a double-acting cylinder with a reversing valve to make this servicing operation easier.

SPECIFIC DESCRIPTION

Figure 1:
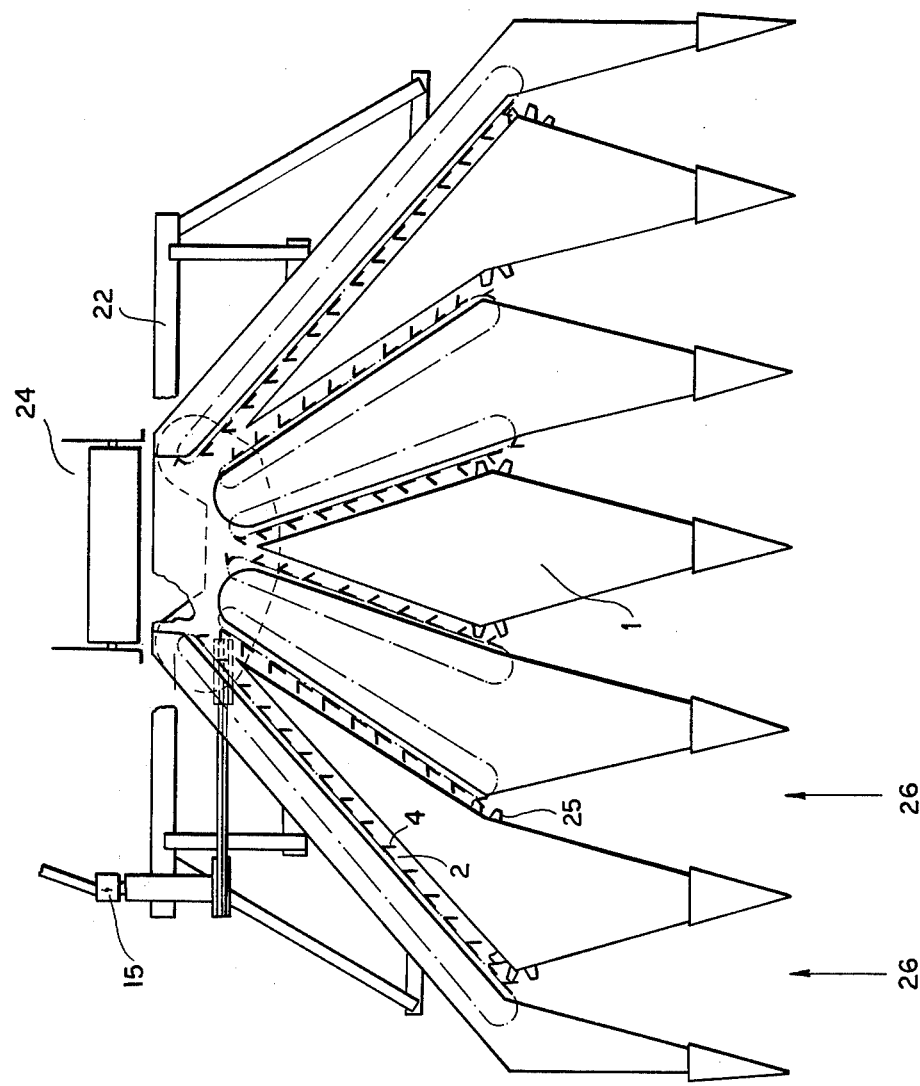
FIG. 1 is a top view of a row-crop harvester according to this invention.
Figure 4:
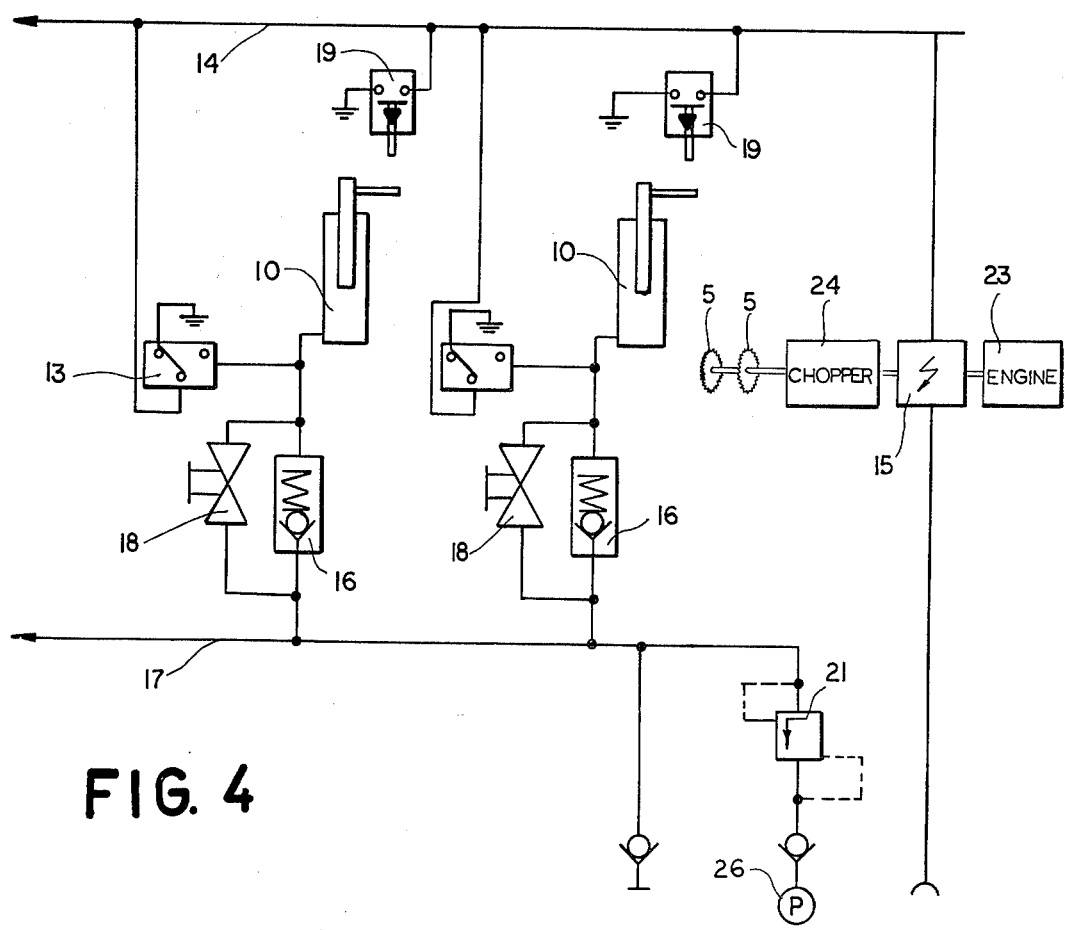
FIG. 4 is a schematic diagram illustrating the operating circuit for the field harvester according to this invention.

A self-propelled stalk-type row-crop harvester has as shown in FIG. 1 a frame 22 provided with seven forwardly extending arms 1 defining six forwardly open throats 26. At the front of each of these throats 26 is a star wheel 25 adapted to cut the bases of stalk-type row-crop entering the throats 26. Each throat 26 furthermore is provided with a respective conveyor chain 4 all of which are driven by means of a common drive such as described in the jointly filed and commonly owned application Ser. No. 913,234, the entire disclosure of which is herewith incorporated by reference. At the back or downstream end of each of the throats 26 there is provided a chopper 24. The engine 23 (see FIG. 4) of the harvester drives both the chopper 24 and the drive sprockets 6 (see FIG. 2) of the device through an electromagnetic clutch 15. When the clutch 15 is closed both the chopper 24 and chains 4 are driven and when open all of these devices stop.

Figure 2:
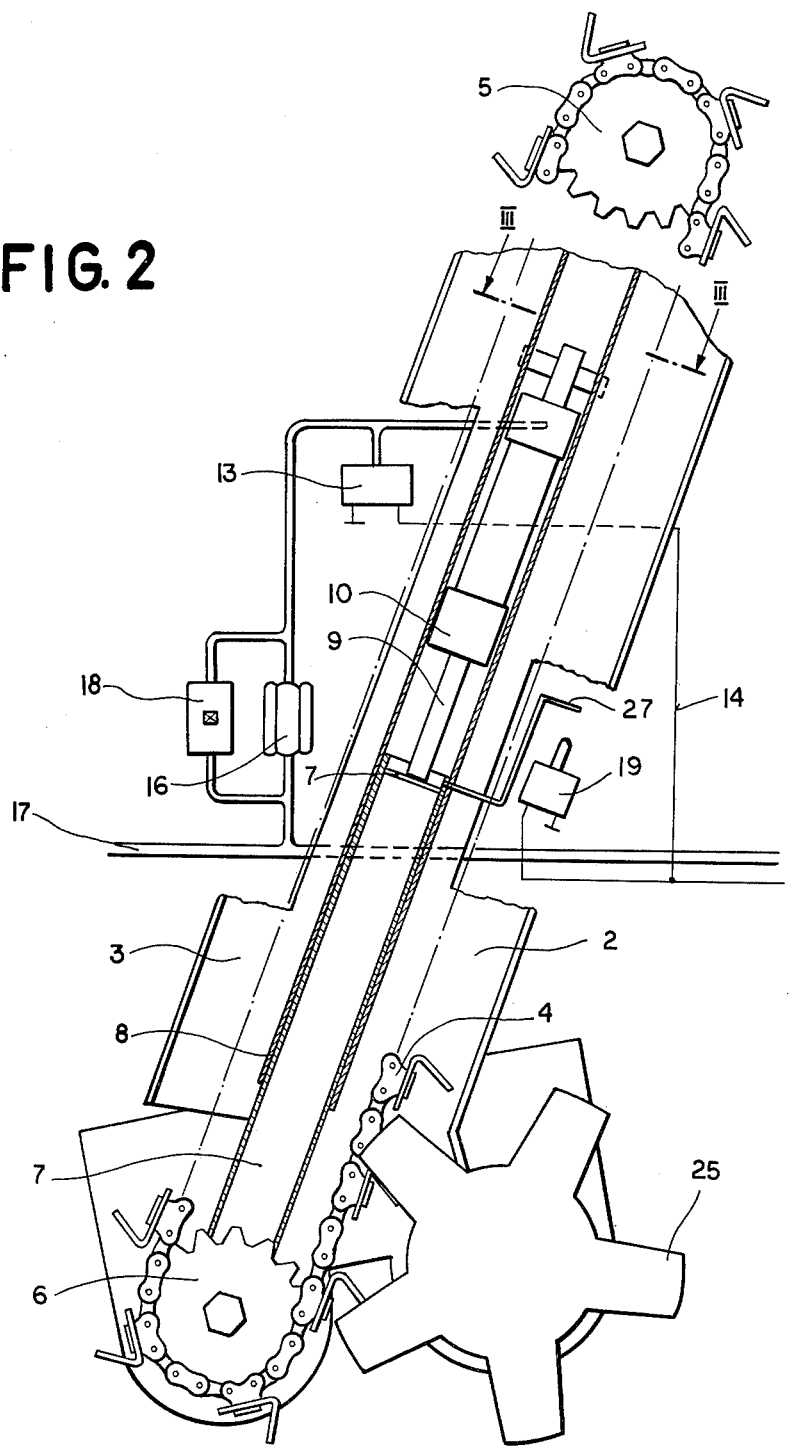
FIG. 2 is a partly sectional view of a detail of the harvester of FIG. 1.
Figure 3:
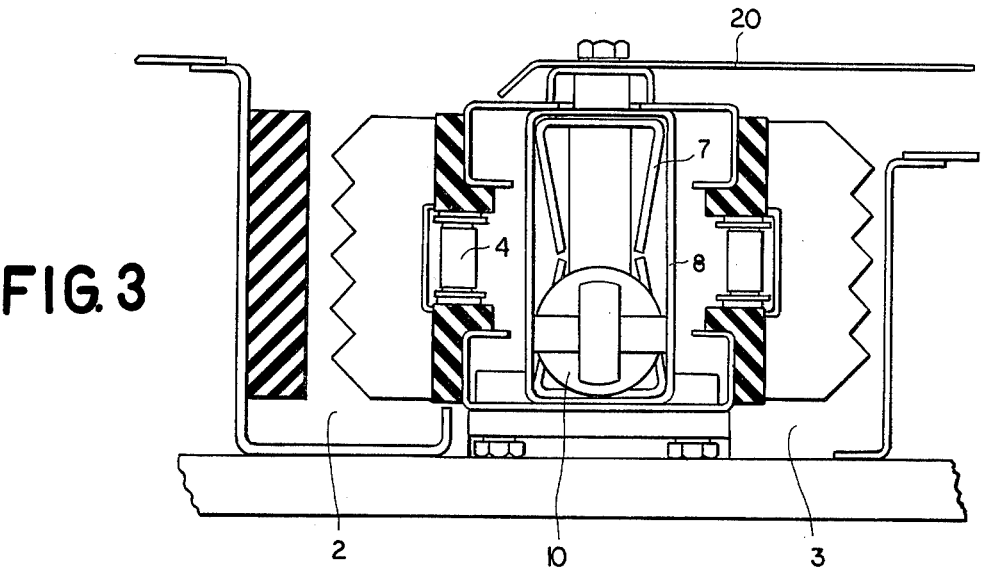
FIG. 3 is a section taken along line III—III of FIG. 2.

As better shown in FIGS. 2 and 3 the frame of the machine forms at each of the chains 4 a pair of parallel passages 2 and 3. The passage 2 constitutes the respective throat 26 and the passage 3 is for the return stretch of the link chain 4. Each chain 4 is spanned over an idler sprocket 5 and a drive sprocket 6 which subdivide each chain 4 into a conveyor stretch snugly received in the passage 2 and a return stretch snugly received in the passage 3. A plurality of hydraulic cylinders 10 mounted on the frame 22 of the harvester each have a piston rod 9 connected to a slide 7 that carries the respective idler sprocket 6 and is displaceable along a respective guide 8.

A pump 26 that delivers pulses of fluid under pressure is connected via a pressure-regulating valve 21 and through a line 17 to each of the single-acting cylinders 10 through respective check valves 16. Between each of the check valves 16 and the respective cylinder 10 there is connected an electric pressure-responsive switch 13 which is also connected to the electromagnetic clutch 15 so that if the pressure inside any of the cylinders 10 drops suddenly or the pressure inside any of the cylinders 10 exceeds a predetermined level this clutch 15 will be opened. Furthermore each slide 7 carries an outwardly extending arm 27 engageable with a respective limit switch 19 similarly connected to the electromagnetic clutch 15 so that when the switch 19 is engaged by the arm 27 the clutch 15 will be opened.

The passage 3 is closed by a removable cover 20 and the check valves 16 are each shunted by an openable blocking valve 18 so that the cylinders 10 can be connected directly to the pressurized line 17 extending between all of the check valves 16 and the pressure-regulating valve 21.

In accordance with the instant invention each of the cylinders 10 is normally pressurized so as to exert a predetermined biasing force on the respective idler sprocket 6 to keep the respective chain 4 taut. The pump 26 delivers periodically varying pulses of pressure having a maximum value corresponding to slightly more than the pressure the valve 21 will allow to pass, and a minimum value equal to considerably less. The check valves 16, nonetheless, ensure that each of the cylinders 10 will remain pressurized at the pressure set by the valve 21.

If one of the chains 4 breaks the pressure in the respective cylinder 10 will be unopposed so that the respective cylinder 10 will extend and press the respective idler sprocket 16 outwardly away from the drive sprocket 5. Such extension will immediately depressurize this cylinder 10 so that the respective valve 13 will respond and open the clutch 15 so shut down the chopper 24 and stop the drives of all of the chains 4. The operator of the machine can then shut down the harvester and remove the cover 20. Opening of the respective valve 18 will allow the cylinder 10 to empty back into the line 17 so that the operator can push the respective idler sprocket 6 back toward the drive sprocket 5. A new complete endless chain can then be fitted over the two sprockets, the valve 18 closed, and the cover 20 replaced. Thereafter restarting of the pump 26 will automatically pressurize the cylinder 10 where the chain was broken so that the respective valve 13 will be pressurized within the safe range to allow reclosing of the clutch 15 and operation of the harvester.

If something becomes wedged in the throat 26 the respective chain 4 will stop and continued rotation of the respective drive sprocket 5 will merely exert a considerable force on the respective idler sprocket 6, translated as an increase in pressure in the respective cylinder 10. Once this pressure exceeds a predetermined limit the respective valve 13 will respond as mentioned above to shut down the entire device. The operator then need merely clear the jammed throat and the device can be started up again.

Finally if one of the chains 4 starts to fail or stretches excessively without breaking the respective slider 7 will move so far outwardly that the arm 27 will engage the switch 19 and will, once again, shut down the machine. Thus if a chain starts to fail or is near the breaking point the operator will automatically be warned by the machine and further damage to it will be prevented.

The relatively close fit between the two passages 2 and 3 and respective stretches of the chain 4 insures that even if the chain does break it will not swing free and engage in the chopper 24. Instead it will become wedged or remain tightly held in the respective passage 2 and 3 for removal by the operator of the machine.

We claim:
1. A row-crop harvester comprising:
   a frame displaceable along the ground and forming at least one forwardly opening throat;
   a drive sprocket and an idler sprocket spaced apart along said throat;
   an endless chain engaged over said sprockets and having a conveyor stretch exposed in said throat and a return stretch adjacent thereto;

an openable clutch having a pair of sides one of which is connected to said drive sprocket;

drive means connected to the other side of said clutch for rotating said drive sprocket and thereby advancing said conveyor stretch in said throat;

a fluid cylinder mounted on said frame and braced against said idler sprocket;

means for pressurizing said cylinder and thereby urging said idler sprocket away from said drive sprocket for tensioning said chain between said sprockets; and safety-cutoff means connected between said cylinder and said clutch for opening the latter when pressure in the former drops suddenly.

2. The harvester defined in claim 1, further comprising a crop chopper on said frame and powered by said drive means.

3. The harvester defined in claim 2 wherein said safety-cutoff means includes a pressure-responsive switch connected between the pressurizing means and said cylinder.

4. The harvester defined in claim 3 wherein said pressure-responsive switch responds to a sudden drop in pressure in said cylinder and to an increase in pressure in said cylinder above a predetermined limit to open said clutch.

5. The harvester defined in claim 3 wherein said clutch is an electromagnetic clutch connected to said drive sprocket and energized through said switch.

6. The harvester defined in claim 2 wherein said safety cutout means includes a limit switch closable on said idler sprocket being displaced beyond a predetermined distance away from said drive sprocket.

7. The harvester defined in claim 1 wherein said frame is formed with a passage closely surrounding said return stretch along the full length thereof.

8. The harvester defined in claim 1, further comprising a check valve between the pressurizing source and said cylinder only permitting fluid flow into said cylinder.

9. The harvester defined in claim 1 wherein said frame includes an elongated guide extending from said drive sprocket toward said idler sprocket, said idler sprocket having a slide rotatably carrying said idler sprocket, displaceable along said slide, and connected to said fluid cylinder.

10. The harvester defined in claim 1 wherein said frame carries a plurality of said sprockets and chains each having a respective cylinder, said cylinders all being connected to the pressurizing source and said drive sprockets all being connected to the drive means.

* * * * *